United States Patent
Roberts et al.

(10) Patent No.: US 11,807,257 B2
(45) Date of Patent: Nov. 7, 2023

(54) SENSING INTERACTIONS WITH UNPERMITTED COMPONENTS WITHIN A VEHICLE

(71) Applicants: Toyota Connected North America, Inc., Plano, TX (US); Toyota Motor North America, Inc., Plano, TX (US)

(72) Inventors: Simon P. Roberts, Celina, TX (US); Yang Ding, Montreal (CA); Daniel W. Reaser, Oak Point, TX (US); Christopher J. Macpherson, Plano, TX (US); Keaton Khonsari, Dallas, TX (US); Derek A. Thompson, Dallas, TX (US); Sergei I. Gage, Redford, MI (US)

(73) Assignees: Toyota Connected North America, Inc., Plano, TX (US); Toyota Motor North America, Inc., Plano, TX (US)

( * ) Notice: Subject to any disclaimer, the term of this patent is extended or adjusted under 35 U.S.C. 154(b) by 38 days.

(21) Appl. No.: 17/340,963

(22) Filed: Jun. 7, 2021

(65) Prior Publication Data

US 2022/0388524 A1 Dec. 8, 2022

(51) Int. Cl.
*B60W 50/12* (2012.01)
*B60W 50/14* (2020.01)
*G01S 13/88* (2006.01)

(52) U.S. Cl.
CPC ............ *B60W 50/12* (2013.01); *B60W 50/14* (2013.01); *G01S 13/88* (2013.01);
(Continued)

(58) Field of Classification Search
CPC .. B60W 50/12; B60W 50/14; B60W 2420/52; B60W 2540/01; B60W 2540/223; G01S 13/88
See application file for complete search history.

(56) References Cited

U.S. PATENT DOCUMENTS 6,393,133 B1 * 5/2002 Breed .................. B60R 22/321
                                                    348/135
6,736,231 B2 * 5/2004 Breed ............... B60R 21/01534
                                                    342/72
(Continued)

FOREIGN PATENT DOCUMENTS

DE    102004036512 A1    3/2006
JP    2018-151693 A      9/2018
(Continued)

OTHER PUBLICATIONS

Li Zhang et al. "Detection Algorithm of Takeover Behavior of Automatic Vehicles' Drivers Based on Deep Learning" 4th international conference on Intelligent Transportation Engineering (Year: 2019).*

(Continued)

*Primary Examiner* — Peter D Nolan
*Assistant Examiner* — Tanya C Sienko
(74) *Attorney, Agent, or Firm* — Christopher G. Darrow; Darrow Mustafa PC (57) ABSTRACT

Systems, methods, and other embodiments described herein relate to sensing interactions of a passenger with components within a vehicle. In one embodiment, a method includes acquiring, from a radar of a vehicle, radar data about a passenger cabin of the vehicle. The method includes determining a current state of the passenger cabin according to the radar data. The method includes, responsive to identifying that the current state indicates that a passenger satisfies a threshold in relation to an unpermitted action, generating a response that counters the unpermitted action.

20 Claims, 5 Drawing Sheets

(52) U.S. Cl.
CPC ..... *B60W 2420/52* (2013.01); *B60W 2540/01* (2020.02); *B60W 2540/223* (2020.02)

(56) References Cited

U.S. PATENT DOCUMENTS

| | | | |
|---|---|---|---|
| 7,401,807 | B2 | 7/2008 | Breed et al. |
| 8,948,955 | B2 | 2/2015 | Zhu et al. |
| 9,886,637 | B1* | 2/2018 | Chan .................. H04N 23/45 |
| 10,159,435 | B1 | 12/2018 | Brankovic |
| 10,208,514 | B2 | 2/2019 | Ramirez Monarrez et al. |
| 10,875,468 | B2 | 12/2020 | Saito et al. |
| 2008/0255725 | A1* | 10/2008 | Geisler ................ B60W 50/12 382/104 |
| 2017/0182939 | A1* | 6/2017 | Phatak .................... B60Q 9/00 |
| 2019/0210615 | A1* | 7/2019 | Caron .................. B60W 50/14 |
| 2019/0258263 | A1* | 8/2019 | Wendel ................. B60N 2/002 |
| 2021/0096236 | A1 | 4/2021 | Choi et al. |
| 2021/0191398 | A1* | 6/2021 | Chen .................. B60W 60/001 |
| 2021/0209386 | A1* | 7/2021 | Remijn ............... A61B 5/0507 |
| 2021/0245763 | A1* | 8/2021 | Gomez .................... G01S 13/66 |
| 2021/0253063 | A1* | 8/2021 | Pupillo ................. B60N 2/002 |
| 2021/0256248 | A1* | 8/2021 | Nagata .............. B60W 60/0059 |
| 2021/0362726 | A1* | 11/2021 | Dingli .................... G06V 20/59 |
| 2021/0394710 | A1* | 12/2021 | Hu ......................... B60W 40/09 |
| 2022/0114817 | A1* | 4/2022 | Gronau ................... G06T 7/246 |
| 2022/0194390 | A1* | 6/2022 | Ucar ................. B60W 50/0097 |
| 2022/0234603 | A1* | 7/2022 | Mujumdar ............ B60W 10/20 |
| 2022/0281460 | A1* | 9/2022 | Lin ........................ G06V 20/59 |
| 2022/0363266 | A1* | 11/2022 | Yasuda ................. B60W 50/14 |
| 2022/0410830 | A1* | 12/2022 | Torabi ...................... G06N 3/02 |

FOREIGN PATENT DOCUMENTS

| | | |
|---|---|---|
| JP | 2018151693 A * | 9/2018 |
| KR | 10-1935653 B1 | 1/2019 |

OTHER PUBLICATIONS

Alizadeh et al., "Low-cost low-power in-vehicle occupant detection with mm-wave FMCW radar," found at: arXiv: 1908.04417v1 [eess.SP] Aug. 12, 2019.

Steinhauser et al., "Millimeter-Wave-Radar Sensor Based on a Transceiver Array for Automotive Applications." IEEE Transactions on Microwave Theory and Techniques 56 (2008): 261-269.

Baird et al., "Principal Component Analysis-based Occupancy Detection with Ultra Wideband Radar" 2017 IEEE 60th International Midwest Symposium on Circuits and Systems (MWSCAS), 2017, pp. 1573-1576, doi: 10.1109/MWSCAS.2017.8053237.

Vayyar "Vayyar Becomes First and Only Company in the World to Offer Full-cabin Monitoring with One-Radar-on-Chip", found at: https://blog.vayyar.com/vayyar-single-chip-three-rows, pp. 1-5, dated Mar. 24, 2021 (accessed May 13, 2021).

Galdia et al., "Localization of Passengers Inside Intelligent Vehicles by the Use of Ultra Wideband Radars", Signal Processing, Image Processing and Pattern Recognition. SIP 2011. Communications in Computer and Information Science, vol. 260. Springer, Berlin, Heidelberg.

Kishore, "Using TI mmWave technology for car interior sensing" found at: https://e2e.ti.com/blogs_/b/behind_the_wheel/posts/ti-mmwave-technology-for-car-interior-sensing, (accessed May 14, 2021).

"How to activate Auto-Lock & Auto-Unlock with VCDS" article, dated Mar. 14, 2018, found at: ,https://www.servicetutorials.com/en/2018/03/14/how-to-set-up-activate-auto-lock-auto-unlock-automatically-with-vcds-vag-com-for-vw-audi-skoda-seat/ (accessed May 17, 2021).

Vayyar, "The Baby Didn't Know She's Been Left in the Car. But the Car Knew (and more)", found at: https://vayyar.com/auto/ (accessed Jun. 7, 2021).

International Search Report and Written Opinion of the International Searching Authority issued in corresponding International Patent Application No. PCT/US2022/032483, dated Sep. 23, 2022.

* cited by examiner

FIG. 5 ized control assistance (e.g., anti-lock braking systems (ABS)), door locks, and so on. While these systems improve the safety of the passengers, they do not serve their purpose when unused or deactivated. Use of the systems, such as door locks and seatbelts or other safety latches, is generally left to the will of the particular user, including latching/locking and unlatching/unlocking. However, when the user is a juvenile or other individual that may not fully appreciate the safety systems, then interference from such passengers can complicate the effective use. For example, a child may view a seatbelt as a toy and may attempt to unlatch the seatbelt without consideration to the safety implications of these actions. Similarly, a child may unlock the door or interfere with other controls (e.g., windows, HVAC, radio, etc.) that represent potentially dangerous circumstances either directly from a door potentially opening or from distracting a driver in the case of modifying settings within the vehicle. Accordingly, the safe and effective use of safety systems can be a complex scenario when considering passengers that may not have the capacity to fully appreciate the use of such systems.

SENSING INTERACTIONS WITH UNPERMITTED COMPONENTS WITHIN A VEHICLE

TECHNICAL FIELD

The subject matter described herein relates, in general, to systems and methods for sensing interactions of a passenger with components within a vehicle, and, more particularly, determining when a child attempts to unlatch a seatbelt or unlock/open a door of the vehicle.

BACKGROUND

Vehicles may employ various safety systems to protect passengers, such as airbags, active/passive restraints, auto-

SUMMARY

Embodiments include systems and methods that relate to improving the use of safety systems within a vehicle by sensing interactions of a passenger with components of the vehicle. As previously noted, the use of various safety systems and the general presence of certain types of passengers within a vehicle can represent difficulties within the context of trusting those passengers to properly use such systems. For example, when children or other individuals are present in the vehicle that do not have the capacity to appreciate how or when to appropriately use the systems, dangerous circumstances may occur. The circumstances can include, by way of example, unlatching a seatbelt at an inappropriate time, unlocking/opening a door at an inappropriate time, and/or otherwise interacting with controls or components within the passenger cabin of the vehicle that may impact the safe operation of the vehicle.

Accordingly, in one embodiment, an approach to improving safety within a vehicle by sensing interactions of passengers with various components of the vehicle is disclosed. For example, a monitoring system may leverage one or more radars within the vehicle to observe passengers and interactions with seat belt latches, door handles and locks, window controls, infotainment controls, HVAC controls, and so on. In one arrangement, the radar observes passengers but provides functionality beyond simple imaging as a camera may provide. Consider that a passenger, such as a child, may be in a car seat, may be covered by a blanket or coat, or other objects (e.g., toys) may obscure a line of sight between a radar sensor and the passenger, thereby making direct observations of the hands of the passenger impractical with visual imaging devices (i.e., RGB cameras and the like).

As such, the monitoring system can leverage various processing approaches with signals from the radar to observe the passenger through objects. That is, the radar provides for seeing through objects, including car seats, blankets, jackets, toys, and so on. Consequently, the monitoring system may initially identify positions of passengers in the vehicle and corresponding areas associated with unpermitted actions by the passengers, such as the previously noted seatbelt latch, door handle/lock, and so on. Accordingly, in one configuration, when a current context indicates that selected actions are not permissible (e.g., when the vehicle is underway) and a passenger of a particular type (e.g., a child) is present, the monitoring system then determines areas that are within reach of the passenger to monitor.

The monitoring system may determine the areas, in one arrangement, by correlating the known locations of controls or other sensitive areas in the vehicle with the passenger. As such, the monitoring system may define bounding boxes at defined depths within the passenger cabin relative to the radar for monitoring. By defining the bounding boxes according to depth instead of, for example, a general area within a two-dimensional frame, the monitoring system focuses the monitoring on the area of interest and without concern about obstructions, such as jackets, blankets, etc. Thus, the monitoring system can iteratively acquire information from the radar and determine when movements of the passenger correspond with unpermitted actions, such as attempts to unlatch a seatbelt.

When the monitoring system senses such actions, the monitoring system can generate a tiered response that is related to the particular infraction. By way of example, the monitoring system may generate a subtle audible alert when the infraction is interacting with HVAC controls while the vehicle is parked. By contrast, the monitoring system provides a more significant audible alert in combination with haptic feedback when, for example, the passenger attempts to interact with the seatbelt latch or door handle/lock when the vehicle is moving. In this way, the present approach can actively sense undesirable actions of a passenger in relation to various components of the vehicle and provide a corresponding alert to a driver in order to facilitate resolving such actions.

In one embodiment, a monitoring system for sensing interactions of a passenger with a vehicle is disclosed. The monitoring system includes one or more processors and a memory communicably coupled to the one or more processors. The memory stores a sensing module including instructions that, when executed by the one or more processors, cause the one or more processors to acquire, from a radar of the vehicle, radar data about a passenger cabin of the vehicle. The sensing module including instructions to determine a current state of the passenger cabin according to the radar data. The sensing module including instructions to, responsive to identifying that the current state indicates that the passenger satisfies a threshold in relation to an unpermitted action, generate a response that counters the unpermitted action.

In one embodiment, a non-transitory computer-readable medium including instructions that, when executed by one or more processors, cause the one or more processors to perform various functions is disclosed. The instructions include instructions to acquire, from a radar of the vehicle, radar data about a passenger cabin of the vehicle. The instructions including instructions to determine a current state of the passenger cabin according to the radar data. The instructions, including instructions to, responsive to identifying that the current state indicates that the passenger satisfies a threshold in relation to an unpermitted action, generate a response that counters the unpermitted action.

In one embodiment, a method is disclosed. In one embodiment, the method includes acquiring, from a radar of a vehicle, radar data about a passenger cabin of the vehicle. The method includes determining a current state of the passenger cabin according to the radar data. The method includes, responsive to identifying that the current state indicates that a passenger satisfies a threshold in relation to an unpermitted action, generating a response that counters the unpermitted action.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving the use of safety systems within a vehicle by sensing interactions of a passenger with components of the vehicle are disclosed. As previously noted, the use of various safety systems and the general presence of certain types of passengers within a vehicle can represent difficulties within the context of trusting those passengers to properly use such systems. For example, when children or other individuals are present in the vehicle that do not have the capacity to appreciate how or when to appropriately use the systems, dangerous circumstances may occur. The circumstances can include, by way of example, unlatching a seatbelt at an inappropriate time, unlocking/opening a door at an inappropriate time, and/or otherwise interacting with controls or components within the passenger cabin of the vehicle that may impact the safe operation of the vehicle.

Accordingly, in one embodiment, an approach to improving safety within a vehicle by sensing interactions of passengers with various aspects of the vehicle is disclosed. For example, a monitoring system may leverage one or more radars within the vehicle to observe passengers and interactions with seat belt latches, door handles and locks, window controls, infotainment controls, HVAC controls, and so on. In one arrangement, the radar observes passengers but provides functionality beyond simple imaging as a camera may provide. Consider that a passenger, such as a child, may be in a car seat, may be covered by a blanket or coat, or other objects (e.g., toys) may obscure a line of sight between a radar sensor and the passenger, thereby making direct observations of the hands of the passenger impractical with visual imaging devices (i.e., RGB cameras and the like).

As such, the monitoring system can leverage various processing approaches with signals from the radar to observe the passenger through objects. That is, the radar may be an ultra-wideband (UWB) radar, a millimeter-wave (MMW) radar, or similar radar technology that enables the disclosed functions. The monitoring system can use the information from the radar to see through objects, including car seats, blankets, jackets, toys, and so on, as well as distinguishing between static and dynamic objects. Consequently, the monitoring system may initially identify positions of passengers in the vehicle and corresponding areas associated with unpermitted actions by the passengers, such as the previously noted seatbelt latch, door handle/lock, and so on. Accordingly, in one configuration, when a current context indicates that selected actions are not permissible (e.g., when the vehicle is underway) and a passenger of a particular type (e.g., a child) is present, the monitoring system then determines areas that are within reach of the passenger to monitor.

The monitoring system may determine the areas for monitoring, in one arrangement, by correlating the known locations of controls or other areas of concern in the vehicle with a reach or within a defined distance (e.g., 1.0 meters) of the passenger. As such, the monitoring system may define bounding boxes at defined depths within the passenger cabin relative to the radar to monitor. By defining the bounding boxes according to depth instead of, for example, a general area within a two-dimensional frame as with an image, the monitoring system focuses the monitoring on the area of interest and without concern about obstructions, such as jackets, blankets, etc. Thus, the monitoring system can iteratively acquire information from the radar and determine when movements of the passenger correspond with unpermitted actions, such as attempts to unlatch a seatbelt.

When the monitoring system senses such unpermitted actions, the monitoring system can generate a tiered response that is related to the particular infraction. By way of example, the monitoring system may generate a subtle audible alert for a minor infraction, such as interacting with HVAC controls. In contrast, the monitoring system may generate a more significant alert in the form of a highly audible alarm in combination with one or more additional feedback haptic feedback or other mechanisms when, for example, the passenger attempts to interact with the seatbelt latch or door handle/lock. In this way, the present approach can actively sense undesirable actions of a passenger in relation to various components of the vehicle and provide a corresponding alert to a driver in order to facilitate resolving such actions.

Figure 1:
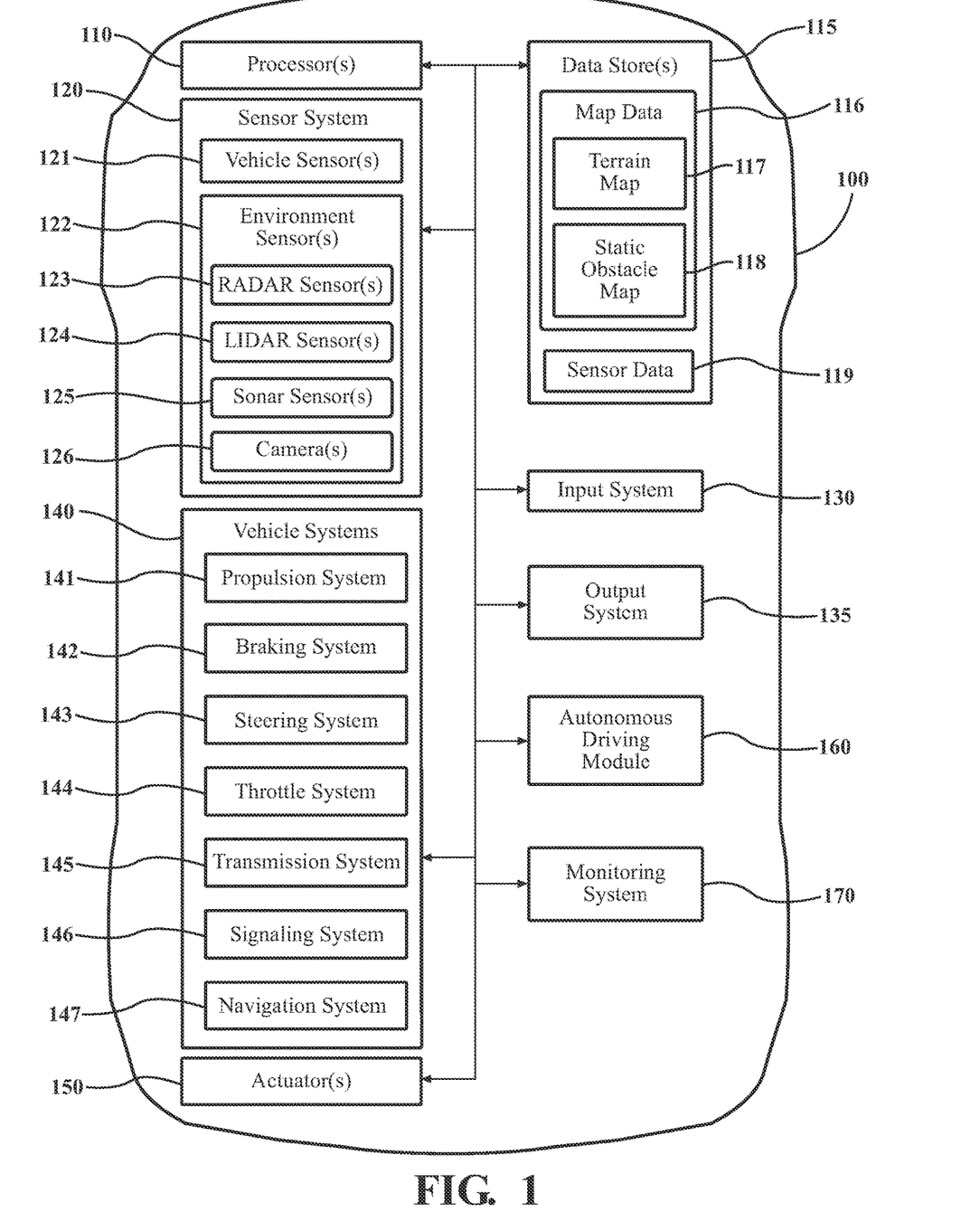
FIG. 1 illustrates one embodiment of a vehicle within which systems and methods disclosed herein may be implemented.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any form of transport that carries passengers within a defined space that is a passenger cabin. Thus, presently disclosed approaches may extend to buses, trains, planes, gondolas, and other people-moving systems.

In any case, the vehicle 100, as described herein, also includes various elements. It will be understood that, in various embodiments, it may not be necessary for the vehicle 100 to have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In any case, the vehicle 100 includes a monitoring system 170 that functions to improve the safety of passengers within a vehicle by sensing unpermitted actions that involve interacting with vehicle components that may influence the safety of the passenger or other passengers in the vehicle 100. The noted functions and methods will become more apparent with a further discussion of the figures.

Figure 2:
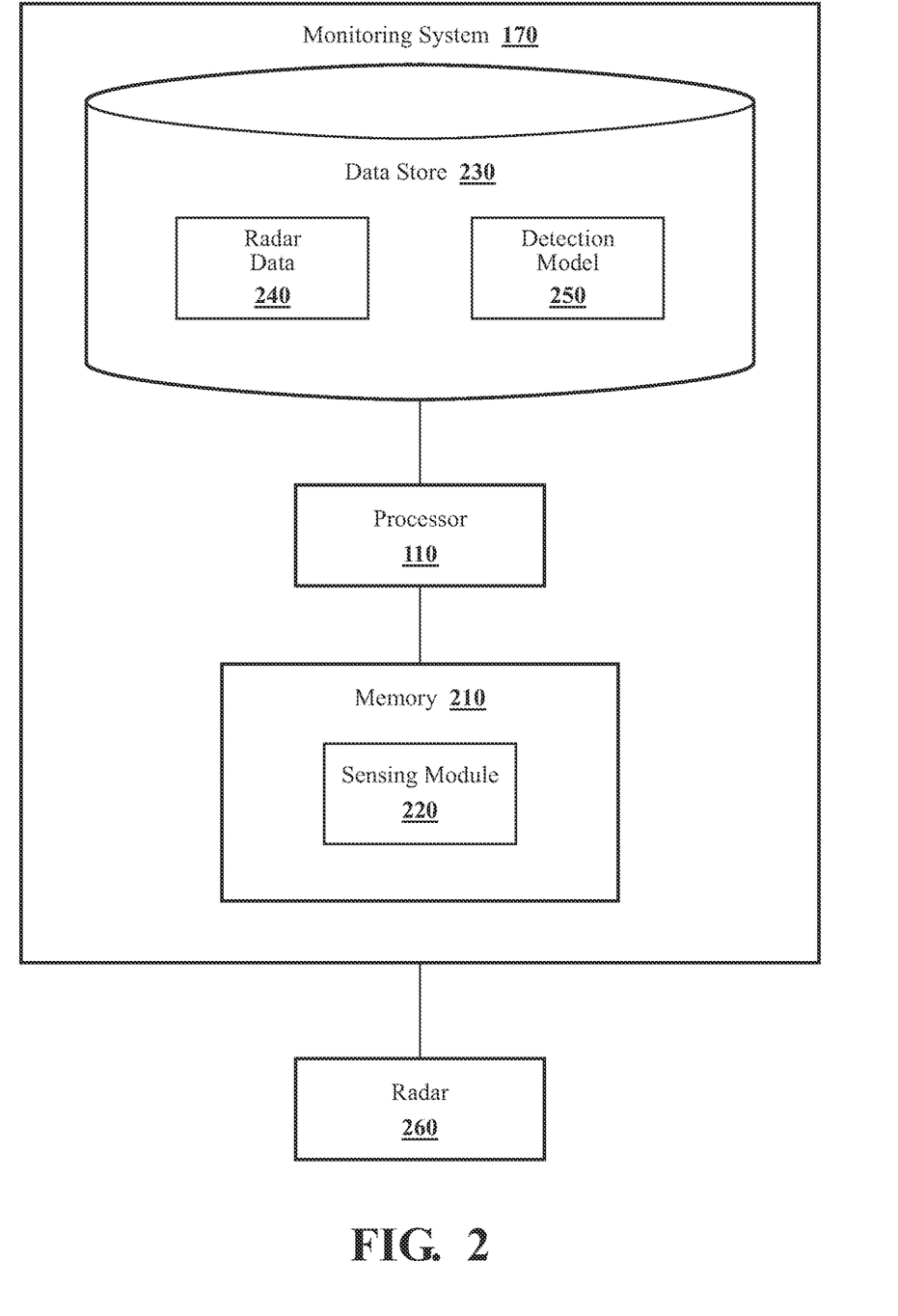
FIG. 2 illustrates one embodiment of a monitoring system that is associated with sensing interactions of a passenger with components within a cabin of a vehicle.

With reference to FIG. 2, one embodiment of the monitoring system 170 is further illustrated. The monitoring system 170 is shown as including a processor 110. Accordingly, the processor 110 may be a part of the monitoring system 170 or the monitoring system 170 may access the processor 110 through a data bus or another communication path. In one or more embodiments, the processor 110 is an application-specific integrated circuit (ASIC) that is configured to implement functions associated with a sensing module 220. In general, the processor 110 is an electronic processor, such as a microprocessor, that is capable of performing various functions, as described herein. In one embodiment, the monitoring system 170 includes a memory 210 that stores the sensing module 220. The memory 210 is a random-access memory (RAM), read-only memory (ROM), a hard disk drive, a flash memory, or another suitable memory for storing the module 220. The module 220 is, for example, computer-readable instructions that, when executed by the processor 110, cause the processor 110 to perform the various functions disclosed herein. Of course, the module 220, in an alternative approach, includes hardware logic, a programmable logic array, or another hardware-based processing system that implements the instructions in a physical form.

Furthermore, in one embodiment, the monitoring system 170 includes a data store 230. The data store 230 is, in one arrangement, an electronic data structure, such as a database that is stored in the memory 210 or another memory and that is configured with routines that can be executed by the processor 110 for analyzing stored data, providing stored data, organizing stored data, and so on. Thus, in one embodiment, the data store 230 stores data used by the module 220 in executing various functions. In one embodiment, the data store 230 includes radar data 240 and a detection model 250 along with, for example, other information that is used by the module 220.

With continued reference to FIG. 2, the sensing module 220 generally includes instructions that function to control the processor 110 to acquire the radar data 240 about a passenger cabin of the vehicle 100 from a radar 260 within the vehicle 100. Accordingly, the sensing module 220, in one embodiment, controls at least one radar 260 within the vehicle 100 to provide the radar data 240. In further embodiments, the sensing module 220 may acquire information from further sensors other than the radar 260, such as cameras, ultrasonic sensors, and so on. For example, the sensing module 220, in one approach, fuses data from separate sensors to provide an observation about a particular aspect of the passenger cabin of the vehicle 100. By way of example, the sensor data itself, in one or more approaches, may take the form of separate images, radar returns (i.e., radar data 240), LiDAR returns, telematics data, and so on. Generally, the sensing module 220 derives determinations (e.g., location, movement, size, etc.) from the acquired sensor data and fuses the data for separate aspects of the observed space with corresponding information.

Of course, while multiple sources are mentioned, the sensing module 220 may rely on the radar data 240 alone to sense position, movements, and other aspects about passengers in the vehicle 100 and associated vehicle components. Additionally, while the sensing module 220 is discussed as controlling the various sensors to provide the sensor data, in one or more embodiments, the sensing module 220 can employ other techniques that are either active or passive to acquire the sensor data. For example, the sensing module 220 may passively sniff the sensor data from a stream of electronic information provided by the various sensors to further components within the vehicle 100. Moreover, while the sensing module 220 is discussed as performing the noted functions within the vehicle 100, in one or more arrangements, the sensing module 220 may be located remotely from the vehicle 100 as a cloud resource to process the radar data 240 and/or other acquired sensor data.

With reference to the radar 260 itself, in one arrangement, the radar 260 is a millimeter-wave (MMW) radar. Thus, radar 260 may use electromagnetic signals having frequencies in the range of 30 to 300 GHz. In further arrangements, the radar 260 is an ultra-wideband (UWB) radar or another type of radar that provides for the functionality discussed herein. The radar 260 itself may be configured as multiple separate devices, and/or with multiple antennas to improve sensing a whole volume of the passenger cabin. In general, the selection of a particular type for the radar 260 is related to functionality provided by the radar 260. For example, the radar 260 generally provides for observing passengers even though objects may obscure a direct line of sight. That is, the radar 260 is capable of imaging the passenger through objects or, phrased otherwise, can see through objects. For example, the sensing module 220 can focus the depth of sensing of the radar 260 within a bounding box defining a space that is associated with a vehicle component of particular interest for monitoring. Thus, the radar 260 provides information about the area of the bounding box regardless of placement of obscuring elements between the radar and the bounding box. Accordingly, the radar 260 can sense the area of the bounding through obstructions, such as clothing, jackets, toys, child safety seats, vehicle seats, backpacks, and other objects. In this way, the sensing module 220 acquires information about the passenger cabin without concerns about items obstructing a view, as may occur with traditional imaging techniques (e.g., RGB cameras).

Moreover, the radar 260 may provide information about separate seating areas within the passenger cabin. The separate seating areas can include rear seating areas, such as middle and back rows within a minivan or another vehicle a multi-row seating arrangement, and back seating areas within sedans, sport utility vehicles (SUVs) and similar vehicles. As a further aspect, the radar 260 may also provide the radar data 240 about front passenger seats and, in one arrangement, even a seat for an operator of the vehicle 100. Thus, in general, the radar data 240 provides observations of areas within the passenger cabin where passengers may be seated in order to provide a complete observation of the passenger cabin.

Accordingly, the sensing module 220 acquires the radar data 240 about the passenger cabin of the vehicle 100 and, in at least one arrangement, performs initial determinations about the passenger cabin. The initial determinations may include identifying the presence of passengers in different seats and the characteristics of the passengers. For example, in one configuration, the sensing module 220 actively identifies when a passenger enters/exits the vehicle 100. Thus, the sensing module 220 may use a door sensor to identify when a passenger may be entering/exiting and perform a scan to identify the presence of a passenger and a particular location within the passenger cabin. Thus, in one arrangement, determining the presence of the passenger is an ongoing determination of a current state of the passenger cabin that functions to dynamically determine changes within the passenger cabin and may further include determining contextual indicators associated more broadly with the vehicle 100, such as determining dynamics of the vehicle 100 (e.g., whether the vehicle is parked or moving and a current trajectory of the vehicle 100 when moving).

The sensing module 220 further, in one approach, determines an age for the passenger once detected to further assess whether the passenger is to be monitored. Of course, in various arrangements, the determination about when to monitor passengers may be implemented according to a preference of the operator. For example, the sensing module 220 may define parameters that indicate when to monitor, and that can be defined according to an input by the operator. Thus, the parameters may indicate to always monitor all passengers, to monitor passengers accordingly to selection by the operator, to automatically determine when to monitor the passengers according to age, and so on.

Thus, the sensing module 220 may use the radar data 240 to estimate a size of the passenger (e.g., height, volume, etc.) in order to provide an estimate of the age. In further arrangements, the sensing module 220 may leverage additional sensors in the vehicle 100 to make this assessment, such as weight sensors in the seats of the vehicle 100. In one arrangement, the sensing module 220 processes the radar data 240 using a machine learning model, such as the detection model 250. Thus, in one approach, the detection model 250 processes the radar data 240 by identifying clusters of associated points within a point cloud from which the detection model 250 defines a volume associated with the passenger, which may indicate a pose and various attributes of the passenger. As such, the detection model 250 can then output an estimated height of the passenger, which the sensing module 220 can use to generally estimate the age of the passenger. In further approaches, the sensing module 220 may instead receive an input from the operator of the vehicle 100 that indicates to implement monitoring for passengers present in the vehicle 100.

In either case, the sensing module 220 determines one or more vehicle components that are proximate to the passenger in order to define areas for monitoring. In one arrangement, the determination of the vehicle components is programmed according to a vehicle type while in further arrangements, the sensing module 220 can dynamically detect the vehicle components or receive inputs from an operator identifying the positions/types of the vehicle components. In the case of programming according to vehicle type, the sensing module 220 may load a configuration from an original equipment manufacturer (OEM) that identifies different components within the passenger cabin. The configuration may specify locations in the passenger cabin for the vehicle components relative to a reference point or set of reference points, such as the receiver of the radar 260 or a set of fiducials placed within the passenger cabin.

Whichever approach is undertaken, the sensing module 220 acquires awareness about the locations of the vehicle components. As applied herein, the vehicle components upon which the sensing module 220 may focus generally include seatbelt latches, door locks, and door handles. In further approaches, the vehicle components also comprise vehicle system controls, such as HVAC controls, infotainment controls (e.g., radio, etc.), window controls, seat position controls, and so on. In yet still further approaches, the vehicle components may include interior surfaces of the passenger cabin, such as a seat back of the operator, windows, sunroofs, and so on. Accordingly, the sensing module 220 may monitor a variety of different vehicle components.

To correlate the vehicle components with a given passenger, the sensing module 220, in one arrangement, determines which of the vehicle components are within a sphere of influence of the passenger. In other words, the sensing module 220 determines which of the vehicle components that a given passenger can interact with according to, for example, a reach of the passenger. Thus, the particular vehicle components may vary according to a location of the passenger in the passenger cabin and a size of the passenger. In an alternative arrangement, the sensing module 220 assumes the passenger may interact with various vehicle components that are proximate to a position in which the passenger is seated within the passenger cabin (e.g., any component with 1.0 meters).

Once correlated, the sensing module 220 defines, for example, a bounding box about the separate vehicle components that correspond to the passenger. The sensing module 220 defines, in one approach, the bounding boxes in three-dimensional space around the vehicle components. The bounding boxes are generally defined relative to the radar 260 so that the sensing module 220 has knowledge about particular spaces within the vehicle 100 to monitor for unpermitted actions. As previously noted, the unpermitted actions are interactions by the passenger with the vehicle components that may result in unsafe circumstances, such as a passenger that is not wearing a seatbelt when the vehicle 100 is underway, an open/unlocked door, an open window, limbs of a passenger hanging out of a window/sunroof, and distractions of the operator by kicking a seatback, unexpected adjustments to infotainment/HVAC, etc.

Accordingly, the sensing module 220 iteratively acquires the radar data 240 to determine a current state of the passenger cabin relative to passengers interacting with the vehicle components. In one approach, the sensing module 220 identifies when a passenger satisfies a threshold in relation to an unpermitted action with a vehicle component. The threshold may define, for example, a particular time for the passenger to interact with or approach a vehicle component. In one arrangement, the threshold defines a time/duration in combination with characteristics of a particular movement as may be identified by the sensing module 220.

For example, consider that the detection model 250, in one configuration, is a machine learning algorithm, such as a convolutional neural network (CNN), a recurrent neural network (RNN), or another deep neural network, which may include a combination of multiple independent neural networks (e.g., both CNNs and RNNs). In any case, the detection model 250 may be integrated with the sensing module 220 and may process the radar data 240 to identify patterns of movement by the passenger. By way of example, the patterns of movement may include extents of motion by different elements of the passenger's arms and hands and may also include identifying subtle movements of the torso, head, etc. In any case, the detection model 250 can process the radar data 240 to identify the patterns of movement by the passenger that indicate a probability of an unpermitted action occurring.

In yet a further aspect, the sensing module 220 may use the sensing module 220 to initially identify the patterns of movement that correspond to the unpermitted actions and then further implement a determination that considers a threshold amount of time proximate to a vehicle component for ultimately triggering a response. It should be appreciated that while the present disclosure generally discusses the use of a machine-learning algorithm to detect the patterns of movement, in further approaches, other mechanisms for detecting the patterns of movement may be employed, such as heuristic-based approaches. In any case, the sensing module 220 defines a threshold that includes both the detection of the movement patterns and a time lingering around the vehicle component that facilitates avoiding false-positive indications. As such, the sensing module 220 monitors the passenger, and, with a particular focus, a bounding box associated with a component to determine when the movements and the timing satisfy the threshold (i.e., when the pattern of movements are sensed, and the timing is sufficient to indicate the unpermitted action). Moreover, it should be appreciated that the detection model 220 may learn the movement patterns for different passengers on a passenger-by-passenger basis, according to a type of the passenger (e.g., an age group), and/or according to a pose/position of the passenger in a seat.

In response to identifying that the current state indicates that the passenger satisfies the threshold, the sensing module 220 generates a response that counters the unpermitted action. As a general premise, the sensing module 220 generates the response to counter any unpermitted action. Thus, in one arrangement, the sensing module 220 generates an alert to an operator of the vehicle 100 that informs the operator about actions of the passenger so that appropriate measures may be taken. In further approaches, the sensing module 220 may provide the response in different forms and may automate the response. Accordingly, the sensing module 220, in one arrangement, generates the response in a tiered manner with escalating actions according to a context of the vehicle 100 and a type of the unpermitted action.

For example, the tiered response may range from a simple audible alert provided to the operator up to automated maneuvers of the vehicle 100. In one approach, the sensing module 220 determines the context according to sensors of the vehicle 100 that inform the sensing module 220 about what the vehicle 100 is presently doing. That is, the sensing module 220 can acquire information from an IMU sensor, or other sensors of the vehicle 100 to determine a speed of the vehicle or general movements of the vehicle. In further aspects, the sensing module 220 may determine a state of the transmission (e.g., park or drive) or other aspects to determine the context. In any case, the sensing module 220 uses the context to determine a severity of the unpermitted actions. For example, when the vehicle 100 is stopped and in park, unlatching a seatbelt, unlocking/opening a door, interacting with other controls (e.g., window, HVAC, etc.) may be considered less of a risk. However, once the vehicle 100 is in drive some of the noted actions become riskier. Even still, once the vehicle 100 is underway at roadway speeds, the actions may be associated with even further risks.

Thus, the sensing module 220 can generate the response according to a tier of actions that correspond with the context. In one approach, the actions include a first tier that defines general alerts that may be audible or haptic alerts. The alerts of the first tier may be provided at a level of intensity (e.g., volume, vibration) that is generally calm and not intended to indicate urgency. The second tier defines alerts having greater urgency (e.g., increased volume/vibration), and may further include automated control of one or more vehicle systems, such as locking a door, locking a window, locking controls for HVAC, infotainment, etc. A third tier can define more urgent actions corresponding with a context that indicates travel at high speed or under difficult driving conditions (e.g., snow, rain, etc.). For example, the third tier may indicate more urgent alerts than the prior tiers with more intense volume/vibrations. The third tier may further include the noted automated controls of the vehicle systems in addition to autonomous control of the vehicle 100 itself, such as emergency pullover or stopping. In this way, the monitoring system 170 can identify the unpermitted actions and provide an appropriate response to improve the safety of the passenger and the vehicle 100 overall.

Figure 3:
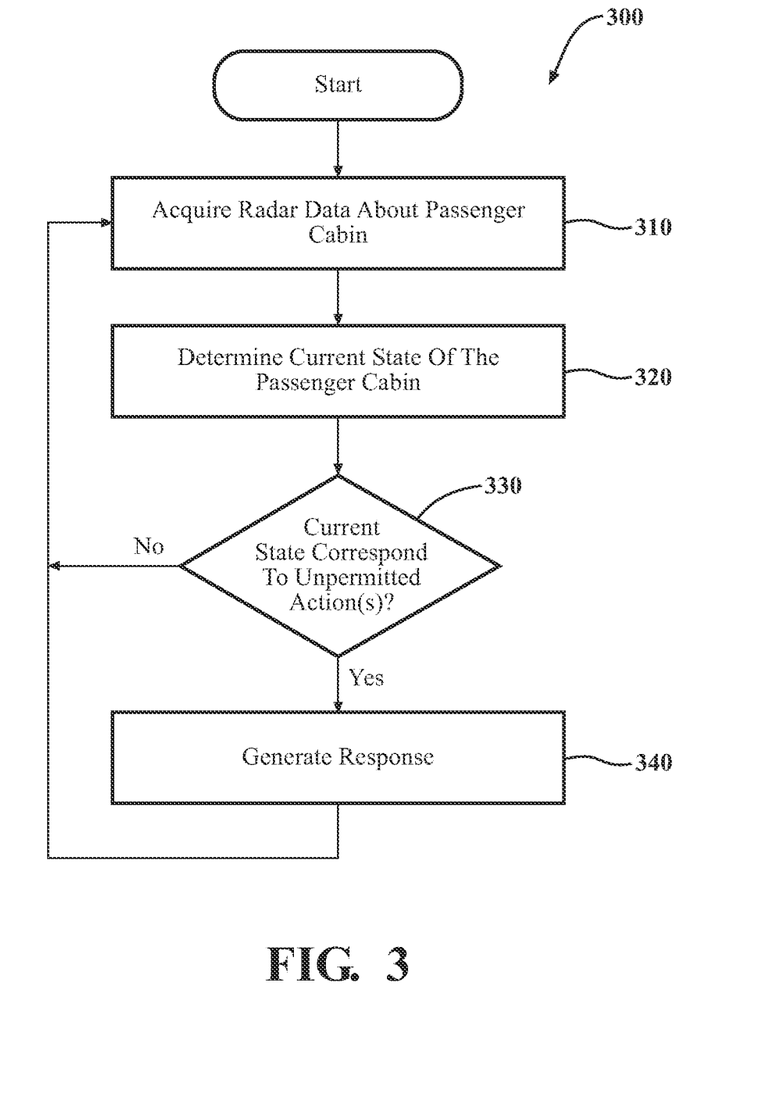
FIG. 3 illustrates one embodiment of a flowchart associated with a method of monitoring a passenger to identify when the passenger is interacting with components within the vehicle.

Additional aspects of improving the safety of passengers within a vehicle by sensing interactions with vehicle components will be discussed in relation to FIG. 3. FIG. 3 illustrates a flowchart of a method 300 that is associated with sensing unpermitted actions by a passenger. Method 300 will be discussed from the perspective of the monitoring system 170. While method 300 is discussed in combination with the monitoring system 170, it should be appreciated that the method 300 is not limited to being implemented within the monitoring system 170 but is instead one example of a system that may implement the method 300.

At 310, the sensing module 220 acquires, from the radar 260, the radar data 240 about a passenger cabin of the vehicle 100. As previously noted, the sensing module 220 iteratively acquires the radar data 240 in order to provide a real-time assessment of the interior of the vehicle 100 in relation to positions and interactions of the passenger(s) with various vehicle components. Accordingly, while the acquisition of the radar data 240 is shown in a serial manner in line with the further functions of method 300, the sensing module 220 may perform the acquisition of the radar data 240 in parallel with one or more of the further disclosed functions.

Moreover, the radar data 240 itself is generally of an area encompassing all seating areas within the vehicle 100. Thus, the radar data 240 from the radar 260 includes information about the passengers, including passenger movements and positions relative to various vehicle components. Additionally, the radar data 240 also includes observations of static components, such as the vehicle components that are to be monitored and other aspects of the vehicle 100. As a general trait, the sensing module 220 can use the radar data 240 to distinguish between static and dynamic objects in the passenger cabin, thereby simplifying the identification of movements of a passenger.

At 320, the sensing module 220 determines a current state of the passenger cabin according to the radar data 240. It should be noted that determining the current state, as used in the present disclosure, generally corresponds with multiple tasks, including, but not limited to performing pre-configuration (e.g., identifying locations of vehicle components), determining passenger occupancy and location, determining a context of the vehicle, and sensing interactions with the vehicle components by a passenger. Thus, at 320, the sensing module 220 processes the radar data 240 to determine several different aspects about the passenger cabin and the vehicle 100 in general that form the current state.

In one arrangement, the sensing module 220 determines the current state by initially identifying a location of a passenger in the passenger cabin. In one approach, identifying the location of a passenger includes processing the radar data 240 according to a detection model 250 that may cluster, segment, and classify patterns within the radar data 240 having characteristics corresponding with a person being present therein. Thus, from the identification of the passenger, the sensing module 220 can determine a location and correlate the passenger with various vehicle components having restricted access. In general, the initial identification of the passenger and correlation with vehicle components may occur as an initialization function and then may include updating a position in order to further track the passenger in case of movement.

Moreover, the sensing module 220 may also estimate an age of the passenger or at least whether the passenger is a child or an adult. From this determination, the sensing module 220 can further refine with which vehicle components the passenger may or may not interact, thereby defining the unpermitted actions for a particular passenger. As previously noted, the sensing module 220 may estimate the age of the passenger according to a size of the passenger, and may also consider a seating arrangement in estimating the age. That is, if the passenger is seated in a child safety seat, then the sensing module 220 may conclude that the passenger is a child. In this way, the sensing module 220 can further refine which vehicle components to monitor that are nearby the passenger.

The sensing module 220 may further define the current state according to a context of the vehicle 100. The sensing module 220 determines the context by, in at least one approach, determining dynamics of the vehicle 100, including a driving state (i.e., a transmission gear—park, drive, reverse) of the vehicle 100 and a current speed. In further approaches, the sensing module 220 may leverage additional data, such as telematics data, IMU data, and so on. In any case, the context generally informs the sensing module 220 about when certain actions by the passenger are more risky (e.g., unlatching a seatbelt).

In still a further aspect, the sensing module 220 defines bounding boxes at locations in the vehicle 100 that are associated with the vehicle components corresponding to passengers being monitored. The bounding boxes generally encircle the vehicle components and are defined according to at least a depth relative to the radar 260. In one arrangement, the sensing module 220 defines a bounding box to generally capture a space about the vehicle component within which an interaction with the vehicle component occurs. As such, the sensing module 220 may define the bounding box to extend outwardly from vehicle component by a defined distance (e.g., 8.0 cm) that may depend on how a passenger commonly interacts with the particular component. Thus, the bounding box may be a three-dimensional space proximate to the vehicle component within which movement by the passenger is considered to be an attempt to interact with the vehicle component. In any case, defining the bounding box at a particular depth and with a particular size facilitates observing the passenger when obstructing objects, such as clothing, seats, toys, and other objects occlude a direct view of the passenger since the sensing module 220 can analyze the radar data 240 according to different depths regardless of the presence of intervening structures.

Accordingly, the sensing module 220 further processes the radar data 240 to identify movements of the passenger that are indicative of the unpermitted action in relation to a vehicle component. For example, the sensing module 220 implements the detection model 250 that functions to identify a series of voxels corresponding with different portions of the passenger. In one arrangement, voxels having a higher intensity (i.e., more movement) may be associated with hand motion while voxels of lesser intensity may be associated with arm, shoulder, torso, and head movement. In any case, the detection model 250 identifies patterns of voxels associated with different parts of a passenger in order to determine when a movement of the passenger is indicative of an interaction with the vehicle component. In general, the detection model 250 may assess the movements by providing confidence scores in relation to how closely a particular movement corresponds with learned movements for an action.

In addition to the assessment of the particular movement, the sensing module 220 may also implement a timing component that assesses how long the passenger lingers over the bounding box associated with the vehicle component. That is, to avoid a positive identification of an interaction when the passenger may momentarily pass a hand over a vehicle component without the intent to interact, the sensing module 220, in one arrangement, defines a time of the interaction for identifying the unpermitted action. In this way, the sensing module 220 can accurately identify when the passenger is attempting to interact with the vehicle component.

At 330, the sensing module 220 identifies whether the current state indicates that a passenger satisfies a threshold in relation to an unpermitted action. In general, the threshold defines an interaction by the passenger with the vehicle component. Thus, defining the interaction generally includes identifying the movement (e.g., according to the detection model 250) and further satisfying the time for the interaction. Accordingly, when the movement and the timing within the bounding box satisfy the threshold, then the sensing module 220 proceeds to provide a response as discussed at 340. Otherwise, the sensing module 220 proceeds to repeat the acquisition of radar data 240 and analysis of the radar data at 310-330.

At 340, the sensing module 220 generates a response that counters the unpermitted action. In various implementations, the sensing module generates the response by controlling a vehicle system, such as a speaker system to provide an audible alert, haptics within a seat/steering wheel of the operator, or another system to provide an alert to an operator about the unpermitted action. As previously noted, the sensing module 220 may generate the response according to a tier of actions and the dynamics. That is, depending on whether the vehicle 100 is presently underway or parked the sensing module 220 may select different actions according to tiers that associate the actions with increased risks as defined by the dynamics. As such, the sensing module 220 may escalate the actions in order to better avoid greater risks when, for example, the vehicle 100 is traveling on a highway versus being parked. In this way, the monitoring system 170 improves the safety of passengers by identifying unpermitted actions in relation to vehicle components.

Figure 4:
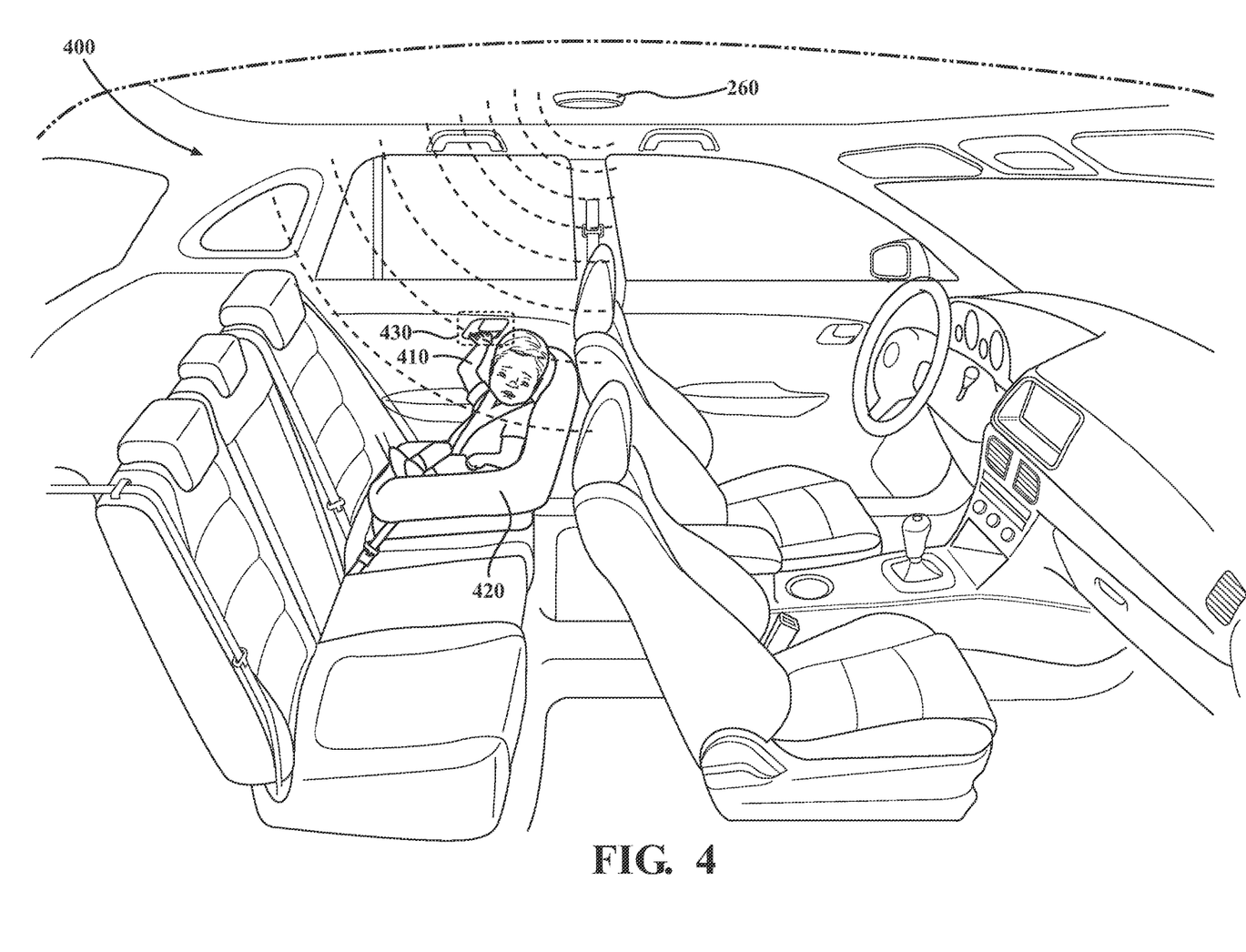
FIG. 4 is an illustration depicting a child attempting to open a door of the vehicle.
Figure 5:
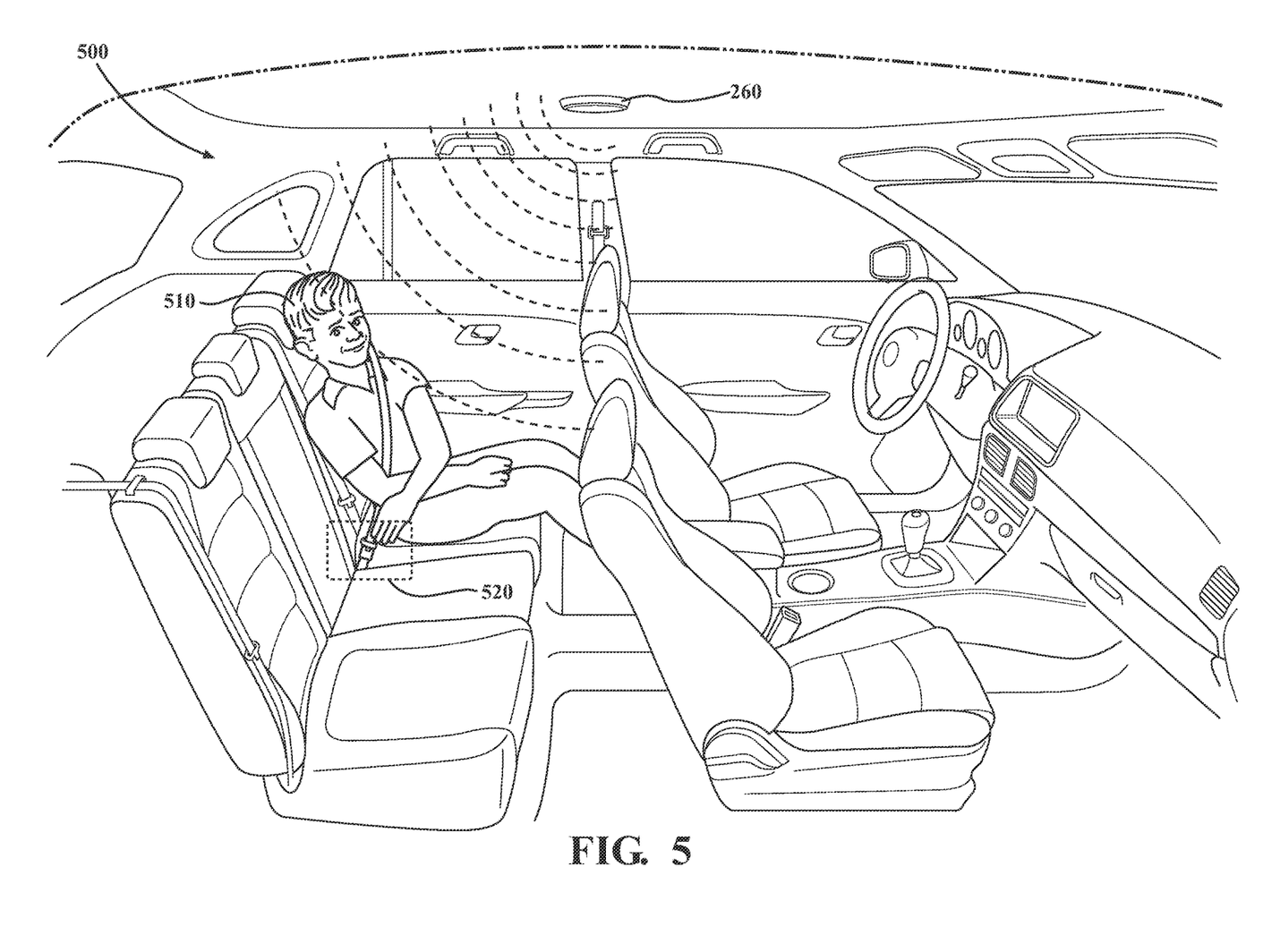
FIG. 5 is an illustration depicting a child attempting to unlatch a seatbelt.

With reference to FIGS. 4-5, additional examples of how the monitoring system 170 functions to improve the safety of the passengers will be described. FIG. 4 illustrates a passenger cabin from a view 400. As shown in view 400, a passenger 410 that is a child is seated in a child safety seat 420 that is rear-facing. Accordingly, the monitoring system 170 functions to acquire the radar data 240 from the radar 260 and identify the current state, including a location of the passenger 410, an estimated age of the passenger 410, and nearby vehicle components with which the passenger should not interact because of potential safety risks. Thus, in the example of FIG. 4, the monitoring system 170 identifies a door handle and lock that is potentially within reach of the passenger 410 and generates a bounding box 430 about the handle and lock to define a monitoring space. As such, the monitoring system 170 monitors the bounding box 430 and may do so even though the car seat 420 partially occludes a direct line of sight from the radar 260 since the radar data 240 can sense the area of the bounding box 430 through the car seat 420. Thus, when the monitoring system 170 identifies an interaction that satisfies the threshold, the monitoring system 170 generates an alert to an operator and/or automatically activates child safety locks on the door to prevent the door from opening according to the context of the vehicle 100. Of course, depending on the context of the vehicle 100 (e.g., whether the vehicle is moving or parked), the monitoring system 170 may forgo the latter response of automatically activating the locks.

FIG. 5 illustrates a view 500 of a passenger cabin within which a passenger 510 is seated in a rear seat. Accordingly, based on the assessment of the radar data 240, the monitoring system 170 determines that the passenger 510 should not interact with a seatbelt latch and therefore defines a bounding box 520 about the seatbelt latch. As noted previously, because the bounding box 520 is defined according to a depth within the passenger cabin relative to the radar 260, the sensing module 220 can identify interactions by the passenger with the seatbelt latch through occlusions, such as a coat, a blanket, and/or other objects. Thus, upon sensing movements by the passenger 510 and timing that corresponds with the unpermitted action of unlatching the seatbelt, the monitoring system 170 can provide an alert to the operator in order to inform the operator that the passenger 510 is attempting to unlatch the seatbelt, which is generally unsafe while the vehicle is underway.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected" or "communicably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124 (e.g., 4 beam LiDAR), one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes a device, or component, that enables information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed. The braking system 142 may further embody an anti-lock braking system (ABS) that generally functions to prevent tires of the vehicle 100 from sliding during a braking maneuver. That is, the ABS functions to detect wheel slip and adjusts braking to prevent the wheel slip, thereby generally improving braking distances in various conditions. Moreover, the braking system 142 and/or the autonomous driving module 160 may include an electronic stability control (ESC) system that functions to selectively brake individual wheels of the vehicle 100 to maintain overall vehicle stability.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the monitoring system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the monitoring system 170, and/or the autonomous driving module(s) 160 may control some or all of these vehicle systems 140 and, thus, may be partially or fully autonomous.

The processor(s) 110, the monitoring system 170, and/or the autonomous driving module(s) 160 can be operatively connected to communicate with the various vehicle systems 140 and/or individual components thereof. For example, returning to FIG. 1, the processor(s) 110, the monitoring system 170, and/or the autonomous driving module(s) 160 can be in communication to send and/or receive information from the various vehicle systems 140 to control the movement, speed, maneuvering, heading, direction, etc. of the vehicle 100. The processor(s) 110, the monitoring system 170, and/or the autonomous driving module(s) 160 may control some or all of these vehicle systems 140.

The processor(s) 110, the monitoring system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the monitoring system 170, and/or the autonomous driving module(s) 160 can control the direction and/or speed of the vehicle 100. The processor(s) 110, the monitoring system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine a position and velocity of the vehicle 100. The autonomous driving module(s) 160 can determine the location of obstacles, obstacles, or other environmental features, including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the monitoring system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A monitoring system for sensing interactions of a passenger with a vehicle, comprising:
one or more processors; and
a memory communicably coupled to the one or more processors and storing:
a sensing module including instructions that, when executed by the one or more processors, cause the one or more processors to:
acquire, from a radar of the vehicle, radar data about a passenger cabin of the vehicle;
determine a current state of the passenger cabin according to the radar data including identifying a vehicle component relative to the passenger including a depth of the vehicle component relative to the radar to provide for observing the passenger through an obstruction in relation to the vehicle component; and
responsive to identifying that the current state indicates that the passenger satisfies a threshold in relation to an unpermitted action, generate a response that counters the unpermitted action.

2. The monitoring system of claim 1, wherein the sensing module includes the instructions to identify that the passenger satisfies the threshold including instructions to determine whether the passenger is interacting with the vehicle component that is restricted for the passenger.

3. The monitoring system of claim 1, wherein the threshold defines an interaction by the passenger with the vehicle component of the vehicle.

4. The monitoring system of claim 1, wherein the sensing module includes the instructions to generate the response including instructions to control a vehicle system, including to provide an alert to an operator of the vehicle about the unpermitted action, and
wherein the unpermitted action includes unlatching a seatbelt, opening a door, unlocking a door, and interacting with vehicle controls.

5. The monitoring system of claim 1, wherein the sensing module includes the instructions to determine the current state including instructions to determine a context of the vehicle that indicates at least dynamics of the vehicle, and
wherein the sensing module includes the instructions to generate the response including instructions to generate the response according to a tier of actions and the dynamics, the tier of actions including instructions to provide an alert, and control a vehicle system associated with the unpermitted action to prevent the unpermitted action.

6. The monitoring system of claim 1, wherein the sensing module includes the instructions to determine the current state including instructions to identify a position of a passenger within the passenger cabin from the radar data, including determining characteristics about the passenger and whether the passenger is seated in a child safety seat.

7. The monitoring system of claim 1, wherein the sensing module includes the instructions to identify that the current state satisfies the threshold including instructions to use a detection model that is a machine-learning algorithm to sense movements of the passenger that are indicative of the unpermitted action in relation to a vehicle component, and
wherein the sensing module includes the instructions to determine the current state including instructions to define a bounding box around the vehicle component to define an area associated with the unpermitted action to monitor.

8. The monitoring system of claim 1, wherein the radar is one of a millimeter-wave (MMW) radar, and an ultra-wideband (UWB) radar.

9. A non-transitory computer-readable medium comprising instructions that, when executed by one or more processors, cause the one or more processors to:
acquire, from a radar of a vehicle, radar data about a passenger cabin of the vehicle;
determine a current state of the passenger cabin according to the radar data, including identifying a vehicle component relative to a passenger including a depth of the vehicle component relative to the radar to provide for observing the passenger through an obstruction in relation to the vehicle component; and
responsive to identifying that the current state indicates that the passenger satisfies a threshold in relation to an unpermitted action, generate a response that counters the unpermitted action.

10. The non-transitory computer-readable medium of claim 9, wherein the instructions to identify that the passenger satisfies the threshold include instructions to determine whether the passenger is interacting with the vehicle component that is restricted for the passenger.

11. The non-transitory computer-readable medium of claim 9, wherein the threshold defines an interaction by the passenger with the vehicle component of the vehicle.

12. The non-transitory computer-readable medium of claim 9, wherein the instructions to generate the response include instructions to control a vehicle system, including to provide an alert to an operator of the vehicle about the unpermitted action, and
wherein the unpermitted action includes unlatching a seatbelt, opening a door, unlocking a door, and interacting with vehicle controls.

13. The non-transitory computer-readable medium of claim 9, wherein the instructions to determine the current state include instructions to determine a context of the vehicle that indicates at least dynamics of the vehicle, and
wherein the instructions to generate the response include instructions to generate the response according to a tier of actions and the dynamics, the tier of actions including instructions to provide an alert, and control a vehicle system associated with the unpermitted action to prevent the unpermitted action.

14. A method, comprising:
acquiring, from a radar of a vehicle, radar data about a passenger cabin of the vehicle;
determining a current state of the passenger cabin according to the radar data, identifying a vehicle component relative to a passenger including a depth of the vehicle component relative to the radar to provide for observing the passenger through an obstruction in relation to the vehicle component; and
responsive to identifying that the current state indicates that the passenger satisfies a threshold in relation to an unpermitted action, generating a response that counters the unpermitted action.

15. The method of claim 14, wherein identifying that the passenger satisfies the threshold includes determining whether the passenger is interacting with the vehicle component that is restricted for the passenger.

16. The method of claim 14, wherein the threshold defines an interaction by the passenger with the vehicle component of the vehicle.

17. The method of claim 14, wherein generating the response includes controlling a vehicle system, including providing an alert to an operator of the vehicle about the unpermitted action, and
   wherein the unpermitted action includes unlatching a seatbelt, opening a door, unlocking a door, and interacting with vehicle controls.

18. The method of claim 14, wherein determining the current state includes determining a context of the vehicle that indicates at least dynamics of the vehicle, and
   wherein generating the response includes generating the response according to a tier of actions and the dynamics, the tier of actions including providing an alert, and controlling a vehicle system associated with the unpermitted action to prevent the unpermitted action.

19. The method of claim 14, wherein determining the current state includes identifying a position of the passenger within the passenger cabin from the radar data, including determining characteristics about the passenger and whether the passenger is seated in a child safety seat.

20. The method of claim 14, wherein identifying that the current state satisfies the threshold includes using a detection model that is a machine-learning algorithm to sense movements of the passenger that are indicative of the unpermitted action in relation to a vehicle component, and
   wherein determining the current state includes defining a bounding box around the vehicle component to define an area associated with the unpermitted action to monitor.

* * * * *

UNITED STATES PATENT AND TRADEMARK OFFICE
CERTIFICATE OF CORRECTION

| | |
|---|---|
| PATENT NO. | : 11,807,257 B2 |
| APPLICATION NO. | : 17/340963 |
| DATED | : November 7, 2023 |
| INVENTOR(S) | : Simon P. Roberts et al. |

It is certified that error appears in the above-identified patent and that said Letters Patent is hereby corrected as shown below:

In the Claims

Claim 14, Column 22, Line 51, please add "including" before "identifying".

Signed and Sealed this
Twenty-third Day of January, 2024

Katherine Kelly Vidal
*Director of the United States Patent and Trademark Office*